(12) United States Patent
Affa et al.

(10) Patent No.: US 7,788,821 B2
(45) Date of Patent: Sep. 7, 2010

(54) LENGTH MEASURING ARRANGEMENT

(75) Inventors: Alfred Affa, Stein/Traun (DE); Johannes Haunreiter, Burghausen (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 193 days.

(21) Appl. No.: 12/215,519

(22) Filed: Jun. 27, 2008

(65) Prior Publication Data
US 2009/0013552 A1 Jan. 15, 2009

(30) Foreign Application Priority Data
Jul. 10, 2007 (DE) .................. 10 2007 031 976

(51) Int. Cl.
*G01D 5/347* (2006.01)
(52) U.S. Cl. .......................... 33/706; 33/702
(58) Field of Classification Search .......... 33/706–708, 33/1 PT, 1 M, 700, 702–703, 705, 783–784, 33/791–792; 356/615–616
See application file for complete search history.

(56) References Cited

U.S. PATENT DOCUMENTS

| | | | |
|---|---|---|---|
| 4,250,381 A | | 2/1981 | Yoshiike et al. |
| 5,095,637 A | * | 3/1992 | Kraus .......................... 33/702 |
| 5,729,218 A | | 3/1998 | Lepperdinger |
| 6,105,271 A | * | 8/2000 | Freitag et al. .................. 33/706 |
| 6,349,481 B1 | * | 2/2002 | Nelle ........................... 33/702 |
| 6,865,820 B2 | * | 3/2005 | Burgschat et al. ............. 33/706 |
| 6,904,696 B2 | * | 6/2005 | Boge et al. .................... 33/706 |
| 2005/0108888 A1 | * | 5/2005 | Burgschat et al. ............. 33/706 |

FOREIGN PATENT DOCUMENTS

| | | |
|---|---|---|
| DE | 29 29 989 A1 | 2/1980 |
| DE | 101 64 404 A1 | 12/2002 |
| EP | 0 733 882 B1 | 10/1999 |

\* cited by examiner

*Primary Examiner*—G. Bradley Bennett
*Assistant Examiner*—Tania C Courson
(74) *Attorney, Agent, or Firm*—Brinks Hofer Gilson & Lione

(57) ABSTRACT

A linear measuring arrangement for measuring a relative position of two objects. The linear measuring arrangement includes a unit having a housing and a scale in the housing and a scanning unit, which can be shifted relative to the unit in a measuring direction, wherein the scanning unit is arranged inside the housing and includes a heat-generating electrical component. The arrangement further includes a mounting piece, which is fastened to the scanning unit by a coupling, which is rigid in the measuring direction and resilient transversely thereto, and which extends to a mounting area arranged outside of the housing. The arrangement further includes a heat-conducting element, which is designed for transferring heat generated by the heat generating electrical component to the mounting piece and permits relative movements between the mounting piece and the scanning unit at least transversely to the measuring direction.

11 Claims, 3 Drawing Sheets

LENGTH MEASURING ARRANGEMENT

RELATED APPLICATIONS

Applicants claim, under 35 U.S.C. §119, the benefit of priority of the filing date of Jul. 10, 2007 of a German patent application, copy attached, Serial Number 10 2007 031 976.4, filed on the aforementioned date, the entire contents of which is incorporated herein by reference.

BACKGROUND

1. Technical Field

The present invention relates to a linear measuring arrangement for measuring the relative position of two objects, having a scale in a housing and a scanning unit, which can be displaced relative to the unit comprised of the scale and the housing, and a mounting piece.

2. Background Information

Such linear measuring arrangements, such as described in DE 29 29 989 A1, for example, are used for measuring lengths, as well as paths, and are employed in particular in processing machinery for measuring the relative movement of a tool in relation to a workpiece to be processed, in coordinate-measuring machinery, and increasingly also in the semiconductor industry.

A scale, which has been placed in a housing for protection against environmental effects, is employed here as the measurement representation. Temperature changes inside the housing cause a change of the length of the scale as a function of the material of the scale. These changes in length lead to measurement errors.

To keep such temperature changes as small as possible, it is proposed in DE 101 64 404 A1 to regulate the temperature in the interior of the encapsulated linear measuring arrangement by passing a controlled cooling medium through it.

By this it is intended to achieve that the scale takes on the temperature of the machine tool. It is disadvantageous here that temperature changes generated by electrical components of the linear measuring arrangement itself are not taken into consideration.

The demands made on linear measuring arrangements continue to increase, higher resolution, as well as increased accuracy and reproducibility of the position measurement continue to be demanded. At the same time a compact mechanical construction, as well as the simple and interference-free generation of measurement values and measurement value transmissions, should be provided.

These requirements demand an encapsulated linear measuring arrangement with a protectively housed scale. High resolution requires an increasingly reduced scanning distance, which is constant over the entire length to be measured. This is achieved on the one hand by a relatively small scanning distance of less than 100 μm, and on the other hand by guiding the scanning unit on the scale and/or on the housing wherein, for the undisturbed precise guidance of the scanning unit, the mounting piece is coupled to the scanning unit by a coupling which is rigid only in the measuring direction. In all other directions, this coupling allows a movement of the mounting piece without an adverse effect on precise guidance and the movement of the scanning unit in the measuring direction.

A compact construction and an interference-free generation of measured values and measured value transmission require the integration of increasingly more electrical components in the scanning unit itself. Therefore sensor chips are increasingly employed for this, on which an array of scanning sensors is arranged, for example light-sensitive detectors in connection with a scale which can be scanned optically-electrically, as well as signal processors, such as A/D converters, amplifiers, micro-processors and interfaces, for example. An increased heat generation in the scanning unit results from this which, because of the required short scanning distance, heats the scale to an incomparatively large extent. This heating leads to changes in the length of the scale and to measurement inaccuracies.

OBJECTS AND SUMMARY OF THE INVENTION

The present invention is based in part on the object of creating a linear measuring arrangement of high measuring accuracy.

In accordance with the present invention, this object is attained by a linear measuring arrangement for measuring a relative position of two objects. The linear measuring arrangement includes a unit having a housing and a scale in the housing and a scanning unit, which can be shifted relative to the unit in a measuring direction, wherein the scanning unit is arranged inside the housing and includes a heat-generating electrical component. The arrangement further includes a mounting piece, which is fastened to the scanning unit by a coupling, which is rigid in the measuring direction and resilient transversely thereto, and which extends to a mounting area arranged outside of the housing. The arrangement further includes a heat-conducting element, which is designed for transferring heat generated by the heat generating electrical component to the mounting piece and permits relative movements between the mounting piece and the scanning unit at least transversely to the measuring direction.

A more compact construction of a linear measuring arrangement is made possible by the present invention, while high measuring accuracy and reproducible position measurement can also be achieved.

By providing a heat-conducting element within the heat-producing electrical component of the scanning unit, in particular between the sensor chip and the mounting piece, a heat-conducting path is created between the electrical component and the mounting piece in order to transfer the heat generated at the electrical component to the mounting piece. Outside of the housing, the mounting piece leads to a first mounting area, so that the heat is further conducted along the mounting piece to the outside. The components involved in the heat-conducting path have low thermal resistance. Moreover, the heat-conducting element is designed in such a way that it permits relative movements between the scanning unit and the mounting piece, at least transversely with respect to the measuring direction, i.e. in those directions, which the coupling located between the scanning unit and the mounting piece permits. Thus a heat-conducting path from the sensor chip in a direction toward the outside of the housing is deliberately created.

Further advantages, as well as details of the present invention, ensue from the following description of an exemplary embodiment by the attached drawing figures.

DETAILED DESCRIPTION OF THE PREFERRED EMBODIMENTS

Figure 1:
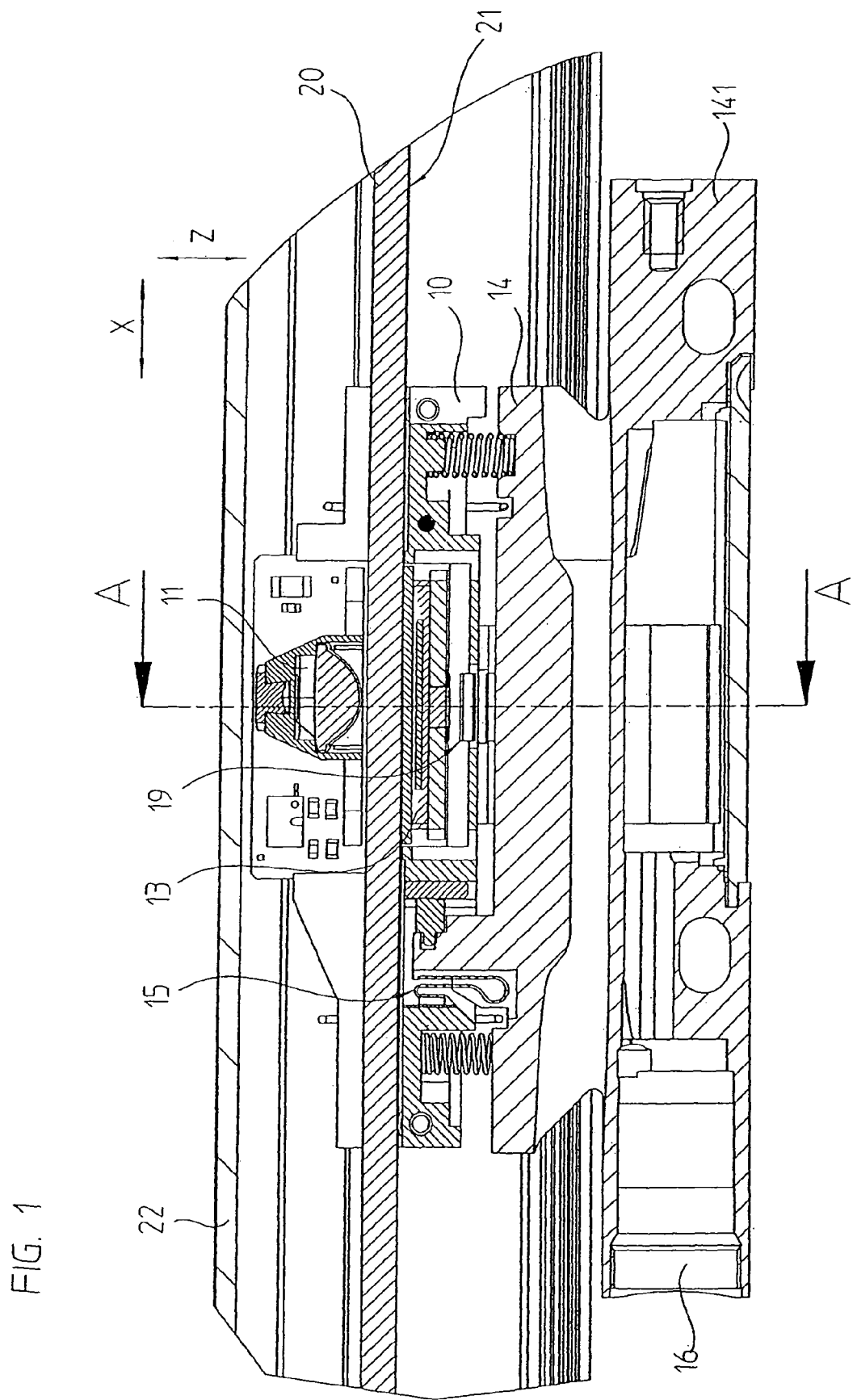
FIG. 1 represents a longitudinal section through an embodiment of a linear measuring arrangement in accordance with the present invention.

The present invention is represented by the example of an optical linear measuring arrangement, by which the relative position of two objects 1 and 2, which can be shifted in relation to each other in the measuring direction X, is to be measured. A transparent scale 20 is scanned in the process by a scanning unit 10, which can be moved in the measuring direction X in relation to the scale 20. The scale 20 has a measuring graduation 21, which is scanned by the scanning unit 10 by transmitted light. For this purpose, the scanning unit 10 has an illuminating unit 11, which emits a bundle of light, which extends collimated through the scale 20 and further through a transparent scanning plate 12 and finally impinges on light-sensitive scanning sensors 133 of a sensor chip 13. In the process, the bundle of light is modulated as a function of its position by the measuring graduation 21 at the scale 20.

The scale 20 is arranged inside a housing 22, which in turn is fixed on the object 2 to be measured, for example a machine bed of a machine tool. Here, the scale 20 is connected in a known manner with the housing 22, for example by gluing or clamping. In its longitudinal direction, the housing 22 has a slit extending in the measuring direction X, which is closed by sealing lips 23 inclined in the shape of a roof and through which a mounting piece 14 extends with a sword-shaped center element. The mounting piece 14 has a mounting area 141, by which it can be fastened to the object 1 which is displaceable relative to the machine bed 2, for example the carriage of the machine tool.

For an exact parallel guidance along the scale 20, the scanning unit 10 is conducted on the latter and/or on the housing 22. In the represented exemplary embodiment, the scanning unit 10 is conducted by rollers on two surfaces of the scale 20, which are oriented perpendicularly to each other, and springs are used for generating a contact pressure force.

A coupling 15 is arranged between the scanning unit 10 and the mounting piece 14, which connects the scanning unit with the mounting piece 14 rigidly in the measuring direction X, and resiliently transversely thereto. Because of this step, wrong orientations of the mounting piece 14 are not transferred to the scanning unit 10. The coupling is only schematically represented. In a manner know per se, it is for example embodied as a spring wire, rigid in the measuring direction, in accordance with DE 29 29 989 A1or, in accordance with EP 0 733 882 B2 as a ball coupling.

The sensor chip 13 has an array of light-sensitive scanning sensors 133, which receive light, modulated by the measuring graduation 21 as a function of the position, from the illuminating unit 11 and generate position-dependent electrical scanning signals SA. The sensor chip 13 is an electrical component containing an integrated circuit which further processes the scanning signals SA. As integrated processor 134 for signal processing, the sensor chip 13 has, for example, A/D converters, amplifiers, microprocessors and also interface units, which process and convert the scanning signals SA into output signals SD, which are present at an output line 17 and are conducted to the outside. If the measuring graduation 21 is an absolute code, the sensor chip 13 processes the scanning signals SA into an absolute multi-digit codeword SD, which is made bit-serially available by a serial interface unit at the output of the sensor chip 13. The mounting piece 14 has a connecting option for the electrical connection of the linear measuring arrangement to an electronic follow-up device. In the example represented, this connecting option is a plug-in connector 16 in the mounting piece 14. The output signals SD from the sensor chip 13 are conducted via a connecting line 17 to this plug-in connector 16. A flexible conductor 18, which leads from the scanning unit 10 to the mounting piece 14, is used as the support of the connecting line 17. The flexible conductor 18 is designed in such a way that it permits movements permitted by the coupling 15, which are as free of adverse reactions as possible, between the scanning unit 10 and the mounting piece 14.

By signal processing, integrated into the sensor chip 13, of the scanning signals SA into a multi-digit code word SD, which defines the position, measurement generation free of interference to a large extent is assured, and a serial transmission, insensitive to interferences, of digital position measurement values SD emanating from the sensor chip 13 is made possible. The relatively large energy requirements, and therefore the generated waste heat, are disadvantageous in connection with signal processing integrated in this way in the smallest space.

The sensor chip 13 is connected with the mounting piece 14 via a heat-conducting element 19. The heat-conducting element 19, as well as the contact of the heat-conducting element 19 with the sensor chip 13 on the one side and with the mounting piece 14 on the other side, are designed in such a way that good heat transfer and good heat output are assured in order to transfer the heat generated at the sensor chip 13 to the mounting piece 14. The heat-conducting element 19 is designed to permit relative movements between the mounting piece 14 and the scanning unit 10 at least in directions transversely to the measuring direction X as free as possible of adverse reactions. For this purpose the heat-conducting element 19 has at least one flexible, or respectively bendable section 191. In the example represented, this section 191 is tape-shaped and made of a material with good heat-conducting properties, preferably copper. Because of the tape shape it is still possible to achieve sufficient flexibility in spite of the relatively large cross section and therefore good heat-conducting capabilities. A good compensation, free of adverse reactions, in directions transversely with respect to the measuring direction X is achieved in that the bendable section 191 has a bend, but in particular several bends, in such a way that the bendable section 191 makes possible, or respectively compensates, a spacing change in the Z-direction. However, the present invention is not limited to the tape shape of the section 191, alternatively stranded wires, in particular a bundle of stranded wires, or movable chain links which are connected with each other to have good heat conductivity, a bellows, a bellows filled with a medium with good heat conductivity, or a plastic element with good heat conductivity, can be employed, wherein with all embodiments of the material of the heat-conducting element 19 it is also possible to use an electrically insulating material.

Figure 3:
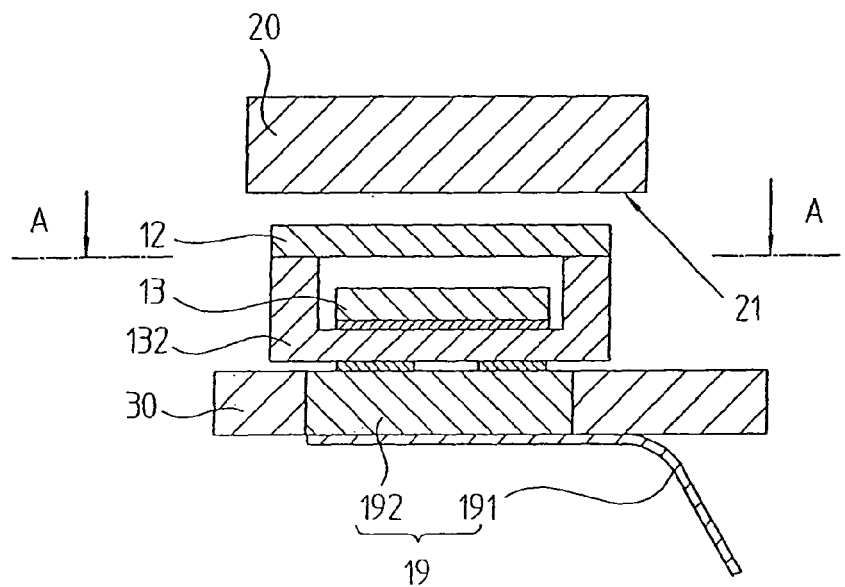
FIG. 3 is a detailed plan view in cross section of the linear measuring arrangement of FIG. 1.
Figure 4:
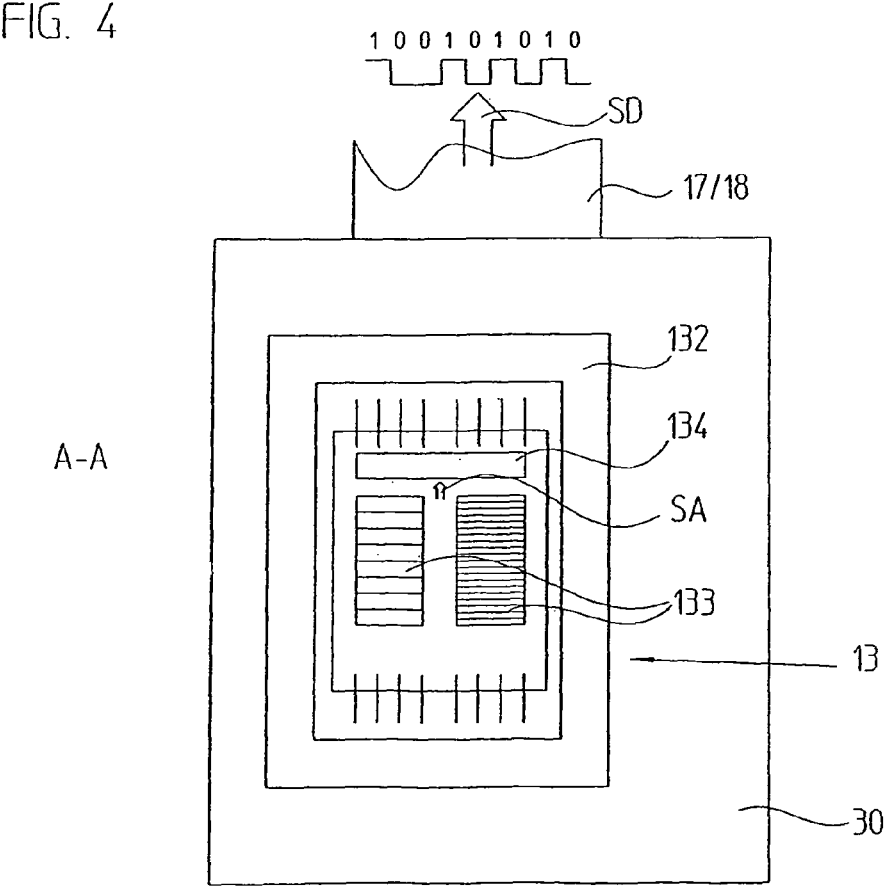
FIG. 4 is a view of the linear measuring arrangement of FIG. 1 from above along the line B-B in FIG. 3.

A coupling with good heat conductivity of the heat-conducting element 19 to the sensor chip 13 is represented in enlarged form in FIG. 3. For example, a sensor chip 13 in a housing is used as the sensor chip 13 and has a ceramic housing 132, whose cover is transparent and functions as a scanning plate 12 in a known manner. The sensor chip 13 is electrically connected with a printed circuit board 30, and the flexible conductor 18 with the electrical connection lines 17 leading to the plug connector 16 is in turn connected to the printed circuit board 30. The sensor chip 13 is electrically connected to one side of the printed circuit board 30, and the flexible section 191 of the heat-conducting element 19 is connected, providing good heat conduction, to the other side of the printed circuit board 30. A heat conductor 192 in the form of a through-contact is provided for heat transfer between the sensor chip 13 and the flexible section 191 of the heat-conducting element 19. This through-contact can be a highly heat-conducting material introduced into a borehole in the printed circuit board 30, or a bolt-shaped element, or can also include a plurality of through-contacts. The heat conductor 192 constitutes a rigid section of the heat-conducting element 19 and a connection with good heat-conducting properties of the underside of the sensor chip 13 with the flexible section 191. The flexible section 191 is connected to the rigid, heat-conducting section 192 over as large a surface as possible and with good heat conductivity, preferably by soldering or gluing.

A connection with good heat conductivity of the heat-conducting element 19 to the sensor chip 13 takes place alternatively by a direct connection of the flexible section 191 of the heat-conducting element 19 to the sensor chip 13, or to a support arranged on the sensor chip 13, for example by soldering over as large as possible a surface. This connection with good heat-conducting properties can take place directly at a surface, in particular the underside of a sensor chip 13 without a housing, or respectively on the underside of the housing 132 of the sensor chip 13 in a housing. In this case the underside is the surface located directly opposite the heat-generating chip area. A connection with good heat conductivity between the sensor chip 13 and the heat-conducting element 19 is achieved if the connecting surface is larger than 5 mm$^2$ in order to keep the heat transfer resistance low.

Figure 2:
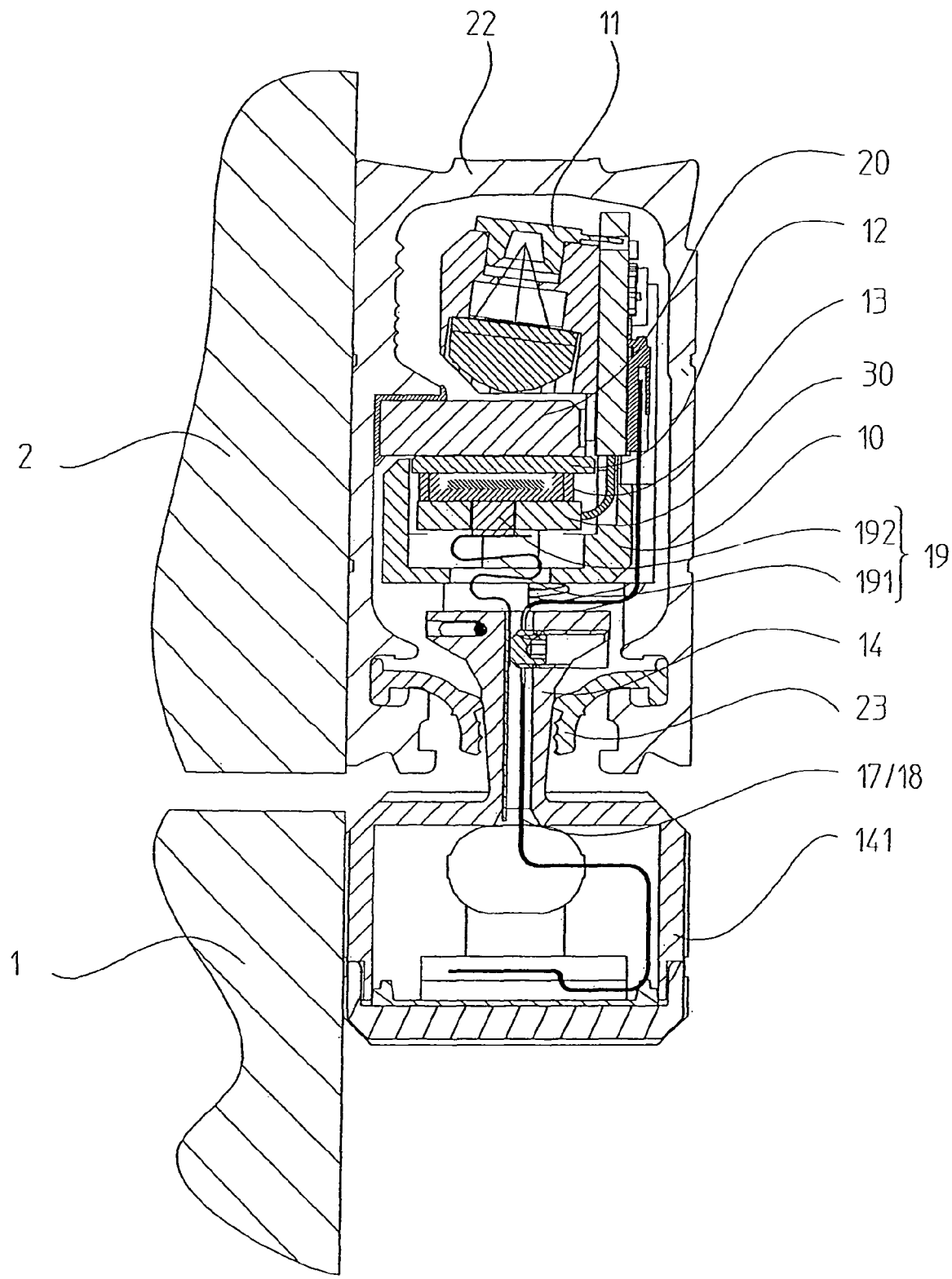
FIG. 2 represents a cross section along the line A-A in the linear measuring arrangement in accordance with FIG. 1.

The heat-conducting element 19 is connected with good heat-conducting properties to the mounting piece 14 in order to transfer the heat generated by the sensor chip 13 to this mounting piece 14. This connection can also be made by soldering or, as represented in FIG. 2, by connection over a large surface with a wall of the mounting piece 14 by clamping with a clamping screw.

A passage has been cut into the mounting piece 14, through which the flexible conductor 18 is conducted from the scanning unit 10 to the plug connector 16. The heat-conducting element 19 is connected to a wall of this passage. This has the advantage that the heat-conducting element 19 is housed in a particularly space-saving and protected manner. The heat generated by the sensor chip 13 and transported via the heat-conducting element 19 to the mounting piece 14 is absorbed by the mounting piece 14. The mounting piece 14 leads from the interior of the housing 22 out to the mounting area 141 and consists of a material which has good heat-conducting properties, so that the absorbed heat is transported via the mounting piece 14 to the outside of the housing 22.

The heat generated by the sensor chip 13 is directly conducted by the heat-conducting element 19 to the massive mounting piece 14. The mounting piece 14 is particularly suited for heat removal, because it has been embodied to be particularly solid for being installed on the object 1 to be measured and as a rule is made of metal, for example aluminum, i.e. a material with good heat-conducting properties. The mounting piece 14 is conducted from the interior of the housing 22 to the outside, so that the heat conducted via the heat-conducting element 19 to the mounting piece 14 is also conducted in this direction, i.e. away from the scale 20.

In a manner not represented it can be of advantage if the heat-conducting element 19, as well as possibly the mounting piece 14, are embodied in the area extending inside the housing 22 to be heat-insulated against the interior of the housing 22, for example provided with a heat-insulating covering, for which neoprene is for example suitable, since it is flexible and therefore does not hamper mobility in the area of the flexible section 191. This covering can also be a coating. By this it is achieved that the heat received by the sensor chip 13 is directly conducted outside the housing 22 and the interior of the housing 22 is not excessively heated. A heat-conducting path, which is heat-insulated against the surroundings, is expressly created from the sensor chip 13 to the surroundings outside the housing 22.

During measuring operations, i.e. when the mounting area 141 of the mounting piece 14 has been installed on the object 1 to be measured, the mounting piece 14 maintains a heat-conducting contact with the object 1 to be measured, so that heat can also be transferred to it. In a manner not represented, heat removal can also further be aided in that cooling structures are provided on the mounting piece 14, namely outside of the housing 22 and/or between the mounting area 141 of the mounting piece 14 and the object 1 to be measured. These cooling structures can be cooling fins or a conduit through which coolant flows.

To prevent the introduction of electrical disturbances into the sensor chip 13 via the mounting piece 14, it may be necessary to electrically insulate the heat-conducting element 19, in particular for preventing an electrical contact between the mounting piece 14 and the heat-conducting element 19. This can be achieved by an interlayer provided between the mounting piece 14 and the heat-conducting element 19 and includes a material which, on the one side, has good heat-conducting properties for connecting the heat-conducting element 19 with the mounting piece 14, and on the other side is insulating. This material is, for example, a ceramic foil.

In the exemplary embodiment represented, the heat-conducting element 19 is conducted independently of the flexible electrical conductor 18. Alternatively, a compact structure is achieved if the flexible section 191 of the heat-conducting element 19 is integrated into the flexible electrical conductor 18 (strip conductors on, or respectively in an electrically insulating, bendable, flexible form). This integration can be such that the flexible section 191 of the heat-conducting element 19 is provided on the electrically insulating flexible conductor 18, besides the electrical connecting lines 17, or that a multi-layer flexible electrical conductor 18 is employed, wherein an electrically insulating layer contains the connecting line 17 and a further layer, electrically insulated from it, constitutes the flexible section 191 of the heat-conducting element 19, wherein this layer is in a connection with good heat-conducting properties with the sensor chip 13, on the one side, and on the other is in a connection with good heat-conducting properties with the mounting piece 14.

The present invention can also be employed in a linear measuring arrangement in which the scale is designed to be reflecting and the sensor chip 13 is located on the same side as the illuminating unit 11. The scale can also be designed to be scanned magnetically, capacitively or inductively, in which case the sensor chip 13 has sensor elements adapted to generate position-dependent scanning signals. In a manner not represented, the sensor chip 13 can also be embodied in several parts, in which all, or only one of these components is cooled in accordance with the present invention, for which reason the present invention in general is related to the directed heat removal from a heat-generating electrical component of the scanning unit 10.

To recapitulate, the present invention relates to a linear measuring arrangement for measuring the relative position of two objects 1, 2, having
  a scale 20 in a housing 22,
  a scanning unit 10, which can be shifted relative to the unit having the scale 20 and the housing 22 in a measuring direction X, wherein the scanning unit 10 is arranged inside the housing 22 and has at least one heat-generating component 13, a mounting piece 14, which is fastened to the scanning unit 10 by a coupling 15, which is rigid in the measuring direction X and resilient transversely thereto, and which extends to a mounting area 141 arranged outside of the housing 22, and a heat-conducting element 19, which is designed for transferring heat generated by the electrical component 13 to the mounting piece 14 and permits relative movements between the mounting piece 14 and the scanning unit 10 at least transversely to the measuring direction X.

In an advantageous manner the electrical component is a sensor chip 13 having scanning sensors 133 for scanning the scale 20 and generating scanning signals SA, as well as processors 134 for processing these scanning signals SA into a position measurement value SD, wherein the position measurement value SD is made bit-serially available by the sensor chip 13 as output signal in the form of a multi-digit code word.

On the one hand, the heat-conducting element 19 is in particular connected in a good heat-conducting manner to an electrical component 13 and, on the other side, it is connected in a good heat-conducting manner to the mounting piece 14.

The mounting piece 14 has a mounting area 141 arranged outside the housing 22 for fastening the mounting piece 14 to the object 1 to be measured, and the mounting piece 14 is made of a material with good heat-conducting properties for conducting the heat absorbed by the heat-conducting element 19 to the mounting area 141.

It is advantageous if the heat-conducting element 19 has at least one flexible, bendable section 191, which in particular is in the shape of a tape.

Copper, for example, is suitable as a material with good heat-conducting properties for the heat-conducting element 19.

It is advantageous if the electrical component 13 is arranged on a printed circuit board 30 and the heat-conducting element 19 has a first section 192, which leads from the electrical component 13 through the printed circuit board 30, and has a second following section 191 which, starting at the first section 192, leads to the mounting piece 14 and permits relative movements between the mounting piece 14 and the scanning unit 10 transversely to the measuring direction X.

If the electrical component 13 arranged on a printed circuit board 30, the heat-conducting element 19 can be a part of a flexible conductor 18, which is conducted from the scanning unit 10 to the mounting piece 14. In this case the flexible conductor 18 contains electrical connecting lines 17 for transmitting position measurement values SD from the sensor chip 13 to a plug connector 16 of the mounting area 141, as well as a conductor designed as a heat-conducting element 19 which, on the one side, is connected in a heat-conducting manner to the sensor chip 13 and, on the other side, is connected in a heat-conducting manner to the mounting piece 14.

The foregoing description is provided to illustrate the invention, and is not to be construed as a limitation. Numerous additions, substitutions and other changes can be made to the invention without departing from its scope as set forth in the appended claims.

We claim:

1. A linear measuring arrangement for measuring a relative position of two objects, the linear measuring arrangement comprising:
   a unit comprising a housing and a scale in said housing;
   a scanning unit, which can be shifted relative to said unit in a measuring direction, wherein said scanning unit is arranged inside said housing and comprises a heat-generating electrical component;
   a mounting piece, which is fastened to said scanning unit by a coupling, which is rigid in said measuring direction and resilient transversely thereto, and which extends to a mounting area arranged outside of said housing;
   a heat-conducting element, which is designed for transferring heat generated by said heat-generating electrical component to said mounting piece and permits relative movements between said mounting piece and said scanning unit at least transversely to said measuring direction.

2. The linear measuring arrangement in accordance with claim 1, wherein said heat generating electrical component comprises a sensor chip comprising scanning sensors for scanning said scale and generating scanning signals, as well as a processor for processing said scanning signals into a position measurement value.

3. The linear measuring arrangement in accordance with claim 2, wherein said position measurement value is made bit-serially available by said sensor chip as an output signal in the form of a multi-digit code word.

4. The linear measuring arrangement in accordance with claim 1, wherein a first side of said heat-conducting element is connected in a good heat-conducting manner to said heat generating electrical component and a second side of said heat conducting element is connected in a good heat-conducting manner to said mounting piece.

5. The linear measuring arrangement in accordance with claim 4, wherein said mounting piece comprises a mounting area arranged outside said housing for fastening said mounting piece to an object to be measured, and said mounting piece is made of a material with good heat-conducting properties for conducting the heat absorbed by the heat-conducting element to said mounting area.

6. The linear measuring arrangement in accordance with claim 1, wherein said heat-conducting element comprises a flexible, bendable section.

7. The linear measuring arrangement in accordance with claim 6, wherein said flexible, bendable section is in the form of a tape.

8. The linear measuring arrangement in accordance with claim 1, wherein said heat-conducting element comprises copper.

9. The linear measuring arrangement in accordance with claim 1, wherein said heat generating electrical component is arranged on a printed circuit board, and said heat-conducting element comprises:
   a first section, which leads from said heat generating electrical component through said printed circuit board, and
   a second section which, starting at said first section, leads to said mounting piece and permits relative movements between said mounting piece and said scanning unit transversely to said measuring direction.

10. The linear measuring arrangement in accordance with claim 1, wherein said heat generating electrical component is arranged on a printed circuit board and said heat-conducting element is a part of a flexible conductor, which is conducted from said scanning unit to said mounting piece.

11. The linear measuring arrangement in accordance with claim 10, wherein said flexible conductor comprises:
   electrical connecting lines for transmitting position measurement values from said sensor chip to a plug connector of said mounting area; and
   a conductor designed as a heat-conducting element, wherein a first side of said conductor is connected in a heat-conducting manner to said sensor chip and a second side of said conductor is connected in a heat-conducting manner to said mounting piece.

* * * * *